US011552574B2

(12) United States Patent
Lin et al.

(10) Patent No.: US 11,552,574 B2
(45) Date of Patent: Jan. 10, 2023

(54) INTERLEAVED THREE PHASE Y-DELTA CONNECTED POWER CONVERTER

(71) Applicant: National Taiwan University of Science and Technology, Taipei (TW)

(72) Inventors: Jing-Yuan Lin, New Taipei (TW); Guan-Lin Chen, Kaohsiung (TW); Kuan-Hung Chen, Taipei (TW); Yi-Feng Lin, Yilan County (TW)

(73) Assignee: National Taiwan University of Science and Technology, Taipei (TW)

( * ) Notice: Subject to any disclaimer, the term of this patent is extended or adjusted under 35 U.S.C. 154(b) by 58 days.

(21) Appl. No.: 17/313,004

(22) Filed: May 6, 2021

(65) Prior Publication Data

US 2022/0140738 A1    May 5, 2022

(30) Foreign Application Priority Data

Nov. 2, 2020   (TW) .................................. 109138026

(51) Int. Cl.
*H02M 3/335*  (2006.01)
*H02M 3/00*   (2006.01)

(52) U.S. Cl.
CPC ......... *H02M 3/33576* (2013.01); *H02M 3/01* (2021.05); *H02M 3/33573* (2021.05)

(58) Field of Classification Search
CPC ............... H02M 3/01; H02M 3/33569; H02M 3/33573; H02M 3/33576; H02M 3/33592
See application file for complete search history.

(56) References Cited

U.S. PATENT DOCUMENTS

| | | | |
|---|---|---|---|
| 2016/0149498 A1 | 5/2016 | Wu et al. | |
| 2020/0204079 A1* | 6/2020 | Guo | H02M 3/285 |
| 2020/0274443 A1* | 8/2020 | Itogawa | H02M 3/33573 |
| 2021/0099097 A1* | 4/2021 | Zhang | H02M 3/33592 |
| 2021/0366645 A1* | 11/2021 | Lu | H02M 3/33576 |
| 2022/0014099 A1* | 1/2022 | Kim | H02M 3/33584 |

FOREIGN PATENT DOCUMENTS

| | | |
|---|---|---|
| EP | 1679783 A2 | 7/2006 |
| TW | 508897 B | 11/2002 |
| TW | 201025810 A1 | 7/2010 |
| TW | 2011206060 A | 6/2011 |
| TW | 202011679 A | 3/2020 |

\* cited by examiner

*Primary Examiner* — Alex Torres-Rivera
(74) *Attorney, Agent, or Firm* — Li & Cai Intellectual Property Office (57) ABSTRACT

An interleaved three-phase Y-Delta connected power converter is provided. The interleaved three-phase Y-Delta connected power converter includes an input voltage source, an input capacitor, a first converter module, a second converter module, an output circuit, and a control circuit. The control circuit calculates a phase shift amount and an operating frequency through voltage and current feedbacks to generate a plurality of switch signal groups for controlling the first converter module and the second converter module, respectively.

10 Claims, 4 Drawing Sheets

INTERLEAVED THREE PHASE Y-DELTA CONNECTED POWER CONVERTER

CROSS-REFERENCE TO RELATED PATENT APPLICATION

This application claims the benefit of priority to Taiwan Patent Application No. 109138026, filed on Nov. 2, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an interleaved three-phase Y-delta connected power converter, and more particularly to an interleaved three-phase Y-delta connected power converter with a phase shift current sharing control mechanism.

BACKGROUND OF THE DISCLOSURE

Due to the existing manufacturing errors among components, errors of magnetic components in particular are likely to be as high as 20%. Such errors lead to uneven distribution of operating currents of power converter modules connected in parallel, resulting in some of the power converter modules having to withstand higher power, and suffering from reduced overall lifespan and system reliability. Further, design conditions that exceed original specifications need to be considered in a circuit design.

Therefore, it is necessary to provide a current sharing mechanism to ensure that each of the power converter modules can evenly distribute currents. However, in the parallel control mode, output loops between the various power converter modules will affect each other, and even cause the circuits to oscillate, which fails to achieve the purpose of output regulation. Therefore, consideration of such factors must be taken into account when designing the circuit.

Therefore, achieving current sharing for multiple power converter modules connected in parallel through a design of the architecture and a control mechanism of a control circuit has become one of the important issues in the art.

SUMMARY OF THE DISCLOSURE

In response to the above-referenced technical inadequacies, the present disclosure provides an interleaved three-phase Y-delta connected power converter with a phase shift current sharing control mechanism.

In one aspect, the present disclosure provides an interleaved three-phase Y-delta connected power converter, including: an input voltage source providing an input voltage; an input capacitor connected in parallel with the input voltage source relative to a first input node and a second input node; a first converter module and a second converter module, each including: a three-phase full bridge circuit connected to the first input node and the second input node, and including a first phase circuit, a second phase circuit, and a third phase circuit, in which the first phase circuit, the second phase circuit and the third phase circuit each include an upper bridge switch and a lower bridge switch connected in series, and have a first center point, a second center point, and a third center point, respectively; a first resonance tank having one end connected to the first center point and having a first resonance capacitor and a first resonance inductance; a second resonance tank having one end connected to the second center point and having a second resonance capacitor and a second resonance inductance; a third resonance tank having one end connected to the third center point and having a third resonance capacitor and a third resonance inductance; a three-phase transformer having a primary side connected to the first resonant tank, the second resonant tank and the third resonant tank in a Y-connection relative to a common node; and a three-phase rectifier circuit including a first-phase rectifier circuit, a second-phase rectifier circuit, and a third-phase rectifier circuit connected in parallel with respect to a first output node and a second output node, in which the first-phase rectifier circuit, the second-phase rectifier circuit and the third-phase rectifier circuit each include an upper bridge rectifier switch and a lower bridge rectifier switch connected in series, and respectively has a first rectifier center point, a second rectifier center point and a third rectifier center point, and the three-phase transformer has a second side connected to the first rectifier center point, the second rectifier center point, and the third rectifier center point in a delta connection; an output circuit including an output capacitor and an output load connected in parallel with respect to the first output node and the second output node; a control circuit including: a voltage feedback unit configured to detect an output voltage of the output circuit; a first calculation module configured to calculate an operating frequency based on a difference between the output voltage and a reference voltage; a current feedback unit configured to detect a load current of the output load and a second load current provided by the second converter module; a second calculation module configured to calculate a first phase shift angle according to the output load current and an ideal operating frequency; a third calculation module configured to calculate a second phase shift angle according to a difference between half of the output load current and the second load current; a pulse width modulation (PWM) module configured to generate, according to the operating frequency and the first phase shift angle, a first switch signal group for driving the three-phase full bridge circuit of the first converter module and a first rectifier switch signal group for driving the three-phase rectifier circuit of the first converter module, and generate, according to the operating frequency, the second phase shift angle and an interleaved control phase, a second signal group for driving the three-phase full bridge circuit of the second converter module and a second rectifier switch signal group for driving the three-phase rectifier circuit of the second converter module, in which there is a 30-degree phase difference between the first switch signal group and the second switch signal group, and a phase difference between the first switch signal group and the first rectifier switch signal group is the first phase shift angle, and a phase difference between the second switch signal group and the second rectifier switch signal group is the second phase shift angle.

In some embodiments, the first calculation module includes a first subtractor and a first proportional integrator, the first subtractor is configured to subtract the output voltage from the reference voltage to generate the difference between the output voltage and the reference voltage, and the first proportional integrator is configured to calculate the operating frequency according to the difference between the output voltage and a reference voltage.

In some embodiments, the third calculation module includes a second subtractor and a second proportional integrator, and the second subtractor is configured to subtract the half of the output load current from the second load current to generate the difference between half of the output load current and the second load current, and the second proportional integrator is configured to calculate the second phase shift angle based on the difference between half of the output load current and the second load current.

In some embodiments, the first switch signal group includes a first switch sub-signal group, a second switch sub-signal group, and a third switch sub-signal group for controlling the first phase circuit, the second phase circuit, and the third phase circuit, respectively. The first switch sub-signal group and the second switch sub-signal group have a phase difference of 120 degrees, and the first switch sub-signal group and the third switch sub-signal group have a phase difference of 240 degrees.

In some embodiments, the first switch sub-signal group includes a first switch signal and a second switch signal for controlling the upper bridge switch and the lower bridge switch of the first phase circuit, respectively, duty cycles of the first switch signal and the second switch signal are 50%, and the first switch signal and the second switch signal are complementary in a switching cycle.

In some embodiments, the second switch signal group includes a fourth switch sub-signal group, a fifth switch sub-signal group, and a sixth switch sub-signal group for controlling the first phase circuit, the second phase circuit, and the third phase circuit, respectively. The fourth switch sub-signal group and the fifth switch sub-signal group have a phase difference of 120 degrees, and the fourth switch sub-signal group and the sixth switch sub-signal group have a phase difference of 240 degrees.

In some embodiments, the first switch sub-signal group and the fourth switch sub-signal group have a phase difference of 30 degrees.

In some embodiments, the first rectifier switch signal group includes a first rectifier switch sub-signal group, a second rectifier switch sub-signal group, and a third rectifier switch sub-signal group for controlling the first-phase rectifier circuit, the second-phase rectifier circuit, and the third-phase rectifier circuit, respectively. The first rectifier switch sub-signal group and the second rectifier switch sub-signal group have a phase difference of 120 degrees, the first rectifier switch sub-signal group and the third rectifier switch sub-signal group have a phase difference of 240 degrees, and a phase difference between the first switch sub-signal group and the first rectifier switch sub-signal group is the first phase shift angle.

In some embodiments, the first rectifier switch sub-signal group includes a first rectifier switch signal and a second rectifier switch signal for controlling the upper bridge rectifier switch and the lower bridge rectifier of the first-phase rectifier circuit, respectively, duty cycles of the first rectifier switch signal and the second rectifier switch signal are 50%, and the first rectifier switch signal and the second rectifier switch signal are complementary in a switching cycle. In some embodiments, the second rectifier switch signal group includes a fourth rectifier switch sub-signal group, a fifth rectifier switch sub-signal group, and a sixth rectifier switch sub-signal group for controlling the first-phase rectifier circuit, the second-phase rectifier circuit, and the third-phase rectifier circuit, respectively. The fourth rectifier switch sub-signal group and the fifth rectifier switch sub-signal group have a phase difference of 120 degrees, the fourth rectifier switch sub-signal group and the sixth rectifier switch sub-signal group have a phase difference of 240 degrees, and a phase difference between the fourth switch sub-signal group and the fourth rectifier switch sub-signal group is the second phase shift angle.

Therefore, the interleaved three-phase Y-delta connected power converter provided by the present disclosure has two three-phase Y-delta connected converters using interleaved control technology, and phases of interleaved switch signals are staggered and have a phase difference of 30 degrees. The interleaved three-phase Y-delta connected power converter is suitable for high-voltage input, low-voltage output, and high-power applications, and modulation phase shift and a frequency current sharing mechanism provided by the present disclosure can reduce output ripples.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
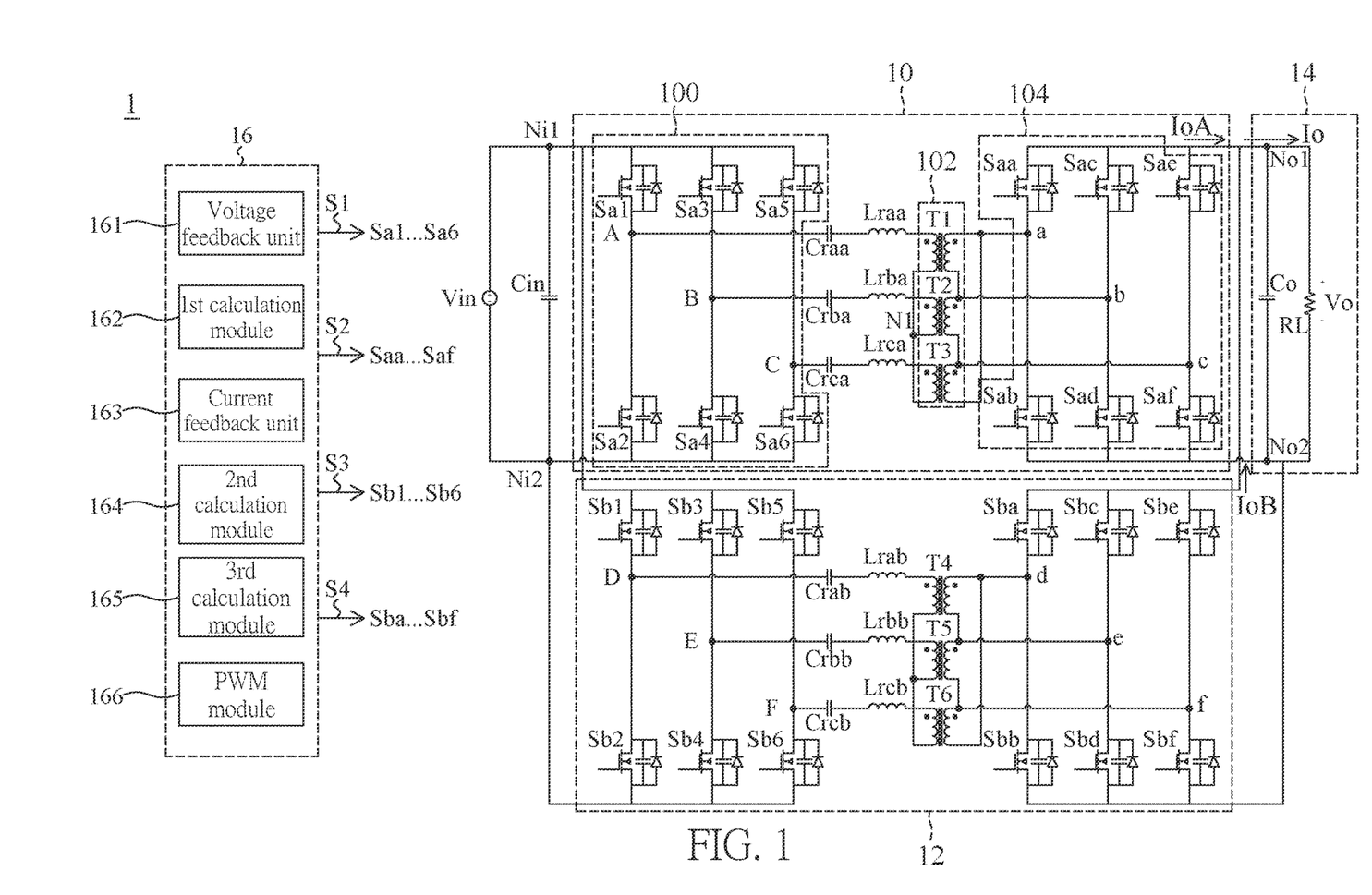
FIG. 1 is a circuit structure diagram of an interleaved three-phase Y-delta connected power converter according to an embodiment of the present disclosure.

Referring to FIG. 1, an embodiment of the present disclosure provides an interleaved three-phase Y-delta connected power converter 1, which includes an input voltage source, an input capacitor Cin, a first converter module 10, a second converter module 12, an output circuit 14, and a control circuit 16.

The input voltage source provides an input voltage Vin, and the input capacitor Cin is connected in parallel with the input voltage source with respect to a first input node Ni1 and a second input node Ni2.

The first converter module 10 and the second converter module 12 are both connected to the first input node Ni1 and the second input node Ni2, and the first converter module 10 and the second converter module 12 have the same structure. First, the first converter module 10 is described. The first converter module 10 includes a three-phase full bridge circuit 100, which is connected to the first input node Ni1 and the second input node Ni2, and includes a first phase circuit, a second phase circuit, and a third phase circuit. The first phase circuit, the second phase circuit, and the third phase circuit each include an upper bridge switch and a lower bridge switch connected in series. For example, the first phase circuit includes switches Sa1 and Sa2, the second phase circuit includes switches Sa3 and Sa4, and the third phase circuit includes switches Sa5 and Sa6. The first phase circuit, the second phase circuit, and the third phase circuit respectively have a first center point A, a second center point B, and a third center point C. The switches Sa1 to Sa6 can be, for example, power switches. Preferably, gallium nitride power switches with a withstand voltage of 650 V, a withstand current of 25 A, and an on-resistance of 50 mS/are selected.

The first phase circuit, the second phase circuit, and the third phase circuit are each connected to their respective resonance tanks (that is, a first resonance tank, a second resonance tank, and a third resonance tank) through the first center point A, the second center point B, and the third center point C. The first resonance tank has a resonance capacitor Craa and a resonance inductance Lraa, the second resonance tank has a resonance capacitor Crba and a resonance inductance Lrba, and the third resonance tank has a resonance capacitor Crca and a resonance inductance Lrca.

A three-phase transformer 102 includes three transformers T1, T2, and T3, primary sides of the three-phase transformer 102 is connected to the first resonance tank, the second resonance tank, and the third resonance tank in a Y connection manner with respect to a common node Nl.

A three-phase rectifier circuit 104 includes a first-phase rectifier circuit, a second-phase rectifier circuit, and a third-phase rectifier circuit connected in parallel with respect to a first output node No 1 and a second output node No2. The first-phase rectifier circuit, the second-phase rectifier circuit, and the third-phase rectifier circuit each include an upper bridge rectifier switch and a lower bridge rectifier switch connected in series. For example, the first-phase rectifier circuit includes switches Saa and Sab, the second-phase rectifier circuit includes switches Sac and Sad, the third-phase rectifier circuit includes switches Sae and Saf, and the first-phase rectifier circuit, the second-phase rectifier circuit, and the third-phase rectifier circuit have a first rectifier center point a, a second rectifier center point b, and a third rectifier center point c. The switches Saa to Saf can be, for example, power switches. Preferably, gallium nitride power switches with a withstand voltage of 80 V, a current withstand of 173 A, and an on-resistance of 2.2 mΩ is selected. A secondary side of the three-phase transformer 102 is connected to the first rectification center point a, the second rectification center point b, and the third rectification center point c in delta connection.

In detail, the concept of three-phase transformer comes from the way that the three-phase AC power is configured. The two most commonly used methods in three-phase AC systems are Y-connected and Delta-connected. For single-phase transformers, three-phase transformers can increase power capacity, and the use of Y-delta is more suitable for buck operation.

Since the second converter module 12 and the first converter module 10 have the same structure, repeated descriptions are omitted hereinafter. It can be seen from FIG. 1 that the three-phase rectifier circuit of the second converter module 12 includes switches Sb1, Sb2, . . . , Sb6, and the three-phase rectifier circuit is connected to three resonant tanks (including of resonant capacitors Crab, Crbb, Crcb and resonant inductors Lrab, Lrbb, Lrcb) through a first center point D, a second center point E, and a third center point F, respectively, and is connected to primary sides of transformers T4, T5, and T6 in Y connection. In addition, the three-phase rectifier circuit of the second converter module 12 includes switches Sba, Sbb, . . . , Sbf, has a first rectifier center point d, a second rectifier center point e, and a third rectifier center point f, and is connected to secondary sides of transformers T4, T5, and T6 in delta connection.

In addition, the output circuit 14 includes an output capacitor Co and an output load RL connected in parallel with the first output node No 1 and the second output node No2.

Here, the first converter module 10 and the second converter module 12 are connected in parallel. However, component errors lead to uneven distribution of operating currents of the first converter module 10 and the second converter module 12 connected in parallel, resulting in part of the power converter modules having to withstand higher power, and have a reduced overall lifespan and system reliability.

To this end, the present disclosure additionally provides a current sharing control mechanism under the above-mentioned architecture to ensure that each power converter module can evenly distribute currents.

Referring again to FIG. 1, the control circuit 16 includes a voltage feedback unit 161, a first calculation module 162, a current feedback unit 163, a second calculation module 164, a third calculation module 165, and a pulse width modulation (PWM) module 166.

The voltage feedback unit 163 can detect an output voltage Vo of the output circuit 14, and the first calculation module 162 can be configured to calculate an operating frequency fsw according to a difference between the output voltage Vo and a reference voltage Vref.

Figure 2:
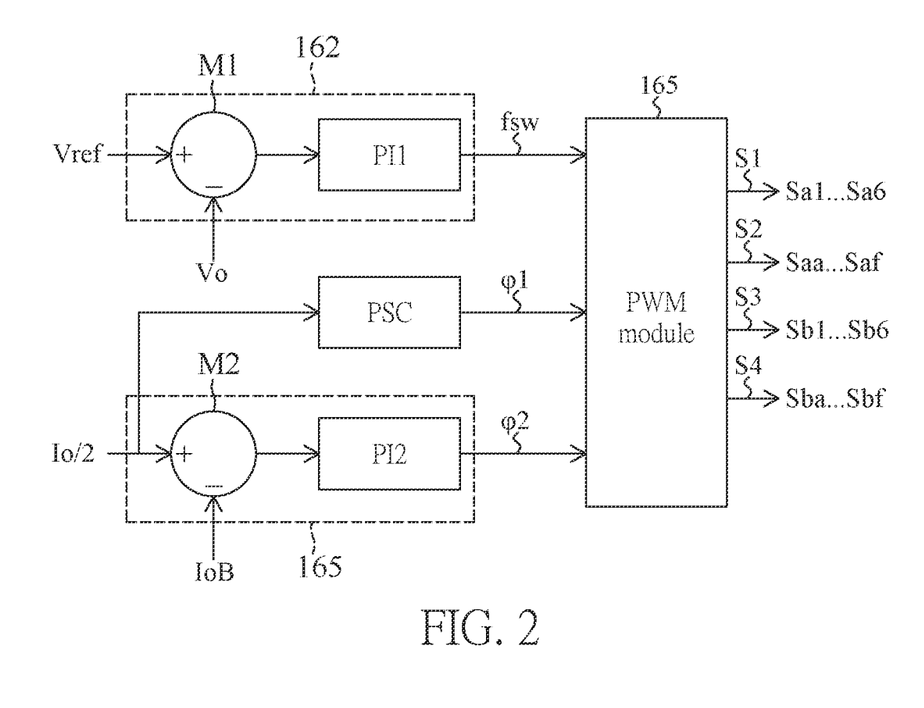
FIG. 2 is an exemplary architecture diagram of a control circuit according to an embodiment of the present disclosure.

Referring to FIG. 2, which is an exemplary architecture diagram of a control circuit according to an embodiment of the present disclosure. As shown in FIG. 2, the first calculation module 162 includes a first subtractor M1 and a first proportional integrator PI1. The first subtractor M1 can subtract the output voltage Vo detected by the voltage feedback unit 161 from the reference voltage Vref to generate the difference, and the first proportional integrator PH calculates the operating frequency fsw based on the difference.

Then, the PWM module 166 can generate a first switch signal group S1 for driving the three-phase full bridge circuit of the first converter module 10 (for example, for driving the switches Sa1 to Sa6) according to the operating frequency fsw.

Figure 3:
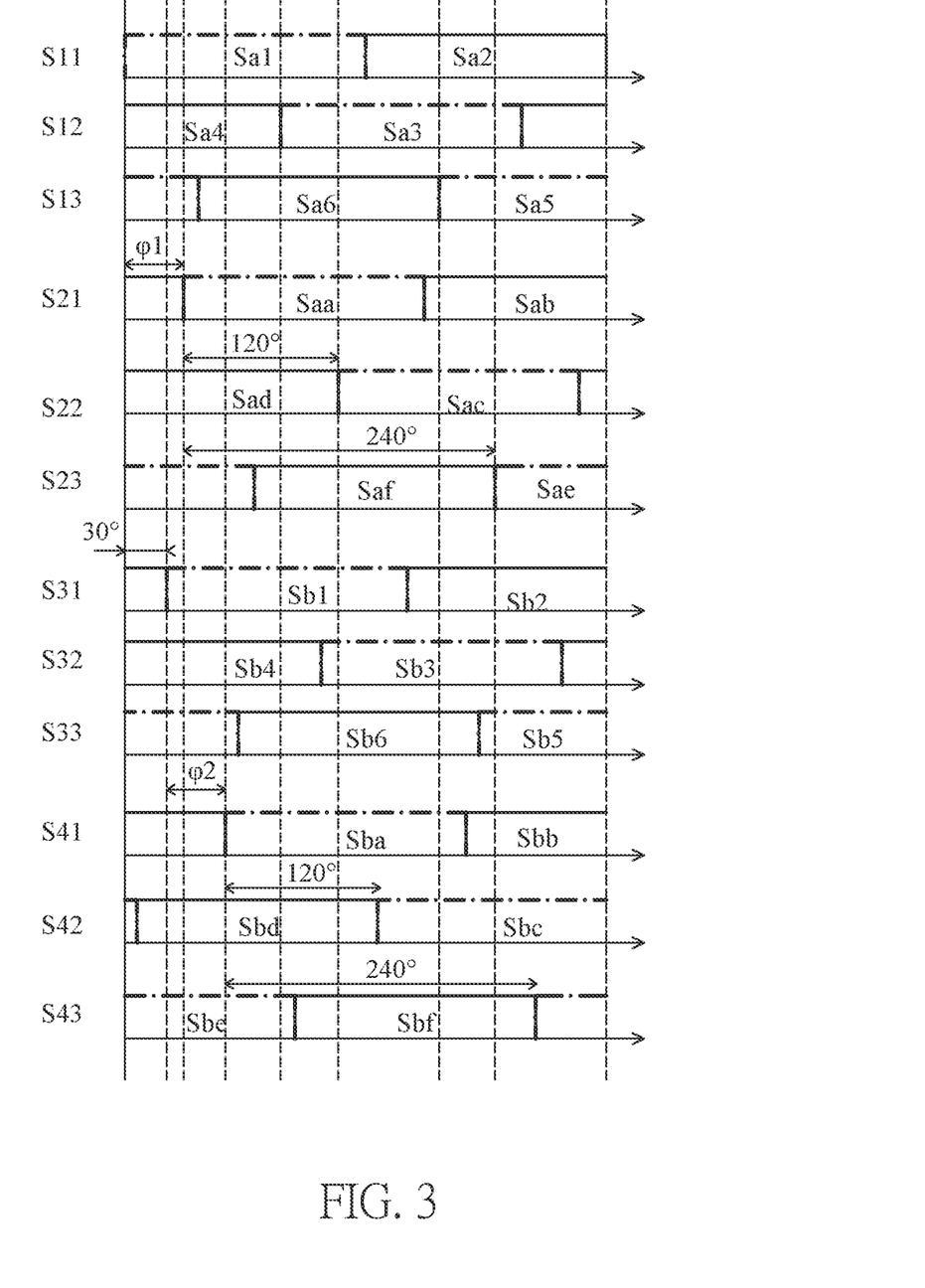
FIG. 3 is a timing diagram of switching signals of an interleaved three-phase Y-delta connected power converter according to an embodiment of the present disclosure.

Further reference can be made to FIG. 3, which is a timing diagram of switching signals of an interleaved three-phase Y-delta connected power converter according to an embodiment of the present disclosure. As shown in FIG. 3, the first switch signal group S1 can include a first switch sub-signal group S11, a second switch sub-signal group S12, and a third switch sub-signal group S13 for controlling the first phase circuit, the second phase circuit, and the third phase circuit, respectively.

The first switch sub-signal group S11 and the second switch sub-signal group S12 have a phase difference of 120 degrees, and the first switch sub-signal group S11 and the third switch sub-signal group S13 have a phase difference of 240 degrees. The first switch sub-signal group S11 includes two switch signals for controlling the upper bridge switch and the lower bridge switch (for example, for controlling the switches Sa1 and Sa2) of the first phase circuit, respectively. Duty cycles of the two switch signals are 50%, and the two switch signals are complementary in a switching cycle.

Similarly, a second switch sub-signal group S12 and a third switch sub-signal group S13 have the same characteristics as the first switch sub-signal group S11, as shown in FIG. 3.

Referring again to FIG. 1, the current feedback unit 163 of the control circuit 16 can detect an output load current Io of the output load RL and a second load current IoB provided by the second converter module 12, and the second load current IoB can also be obtained by detecting a first load current IoA provided by the first converter module 10.

Furthermore, the second calculation module 164 can calculate a first phase shift angle φ1 according to the output load current Io and an ideal operating frequency. As shown in FIG. 2, the second calculation module 164 can be, for example, a phase shift circuit PSC, which is configured to calculate the ideal operating frequency at which the first converter module 10 is expected to operate, and the first phase shift angle φ1 required for the operation of the first converter module 10 can be obtained by the following equation (1):

$$\varphi = \frac{I_O \times \omega L_{ra} \times G_{ain}}{n^2 V_o} + \frac{\pi}{6}. \quad \text{equation (1)}$$

As shown in equation (1), adjustable variables are obtained to be an angular frequency, an angular phase, and an inductance.

After obtaining the first phase shift angle φ1, the PWM module 166 can generate the first rectifier switch signal group S2 for driving the three-phase rectifier circuit 104 of the first converter module 10 according to the operating frequency fsw and the first phase shift angle φ1.

As shown in FIG. 3, the first rectifier switch signal group S2 includes a first-phase rectifier switch sub-signal group S21, a second-phase rectifier switch sub-signal group S22, and a third-phase rectifier switch sub-signal group S23 for controlling the first phase rectifier circuit, the second phase rectifier circuit, and the third-phase rectifier circuit, respectively. Corresponding to the first switch signal group S1, the first rectifier switch sub-signal group S21 and the second rectifier switch sub-signal group S22 have a phase difference of 120 degrees, the first rectifier switch sub-signal group S21 and the third rectifier switch sub-signal group S23 have a phase difference of 240 degrees, and a phase difference between the first switch sub-signal group S11 and the first rectifier switch sub-signal group S21 is the first phase shift angle φ1 obtained above.

In addition, as shown in FIG. 3, the first rectifier switch sub-signal group S21 includes two rectifier switch signals for controlling the upper bridge rectifier switch and the lower bridge rectifier switch of the first phase rectifier circuit, respectively. For example, the two rectifier switch signals are used to control the switches Saa and Sab. As shown in FIG. 3, duty cycles of the two rectifier switch signals are 50% respectively, and the two rectifier switch signals are complementary in a switching cycle.

Figure 4:
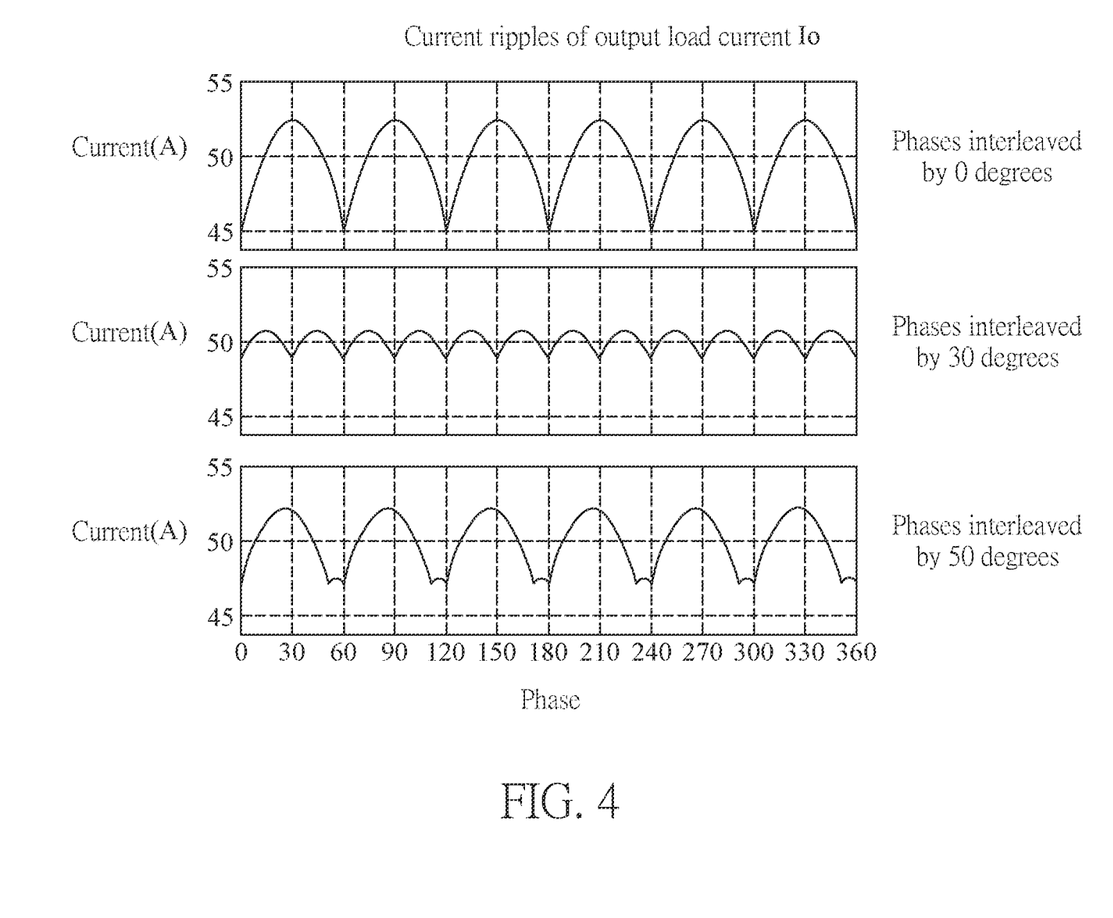
FIG. 4 is a schematic diagram showing current ripples in which phases of a first converter module and a second converter module are interleaved by 0, 30, and 50 degrees, respectively.

In applications of the three-phase Y-Δ connection converter, since full-wave rectified direct currents flow through capacitors, sine wave currents are used as an example here. Reference is made to FIG. 4, which is a schematic diagram showing current ripples in which phases of a first converter module and a second converter module are interleaved by 0, 30, and 50 degrees, respectively. As shown in FIG. 4, when the first and second converter modules 10 and 12 are connected in parallel, the output power will be twice that of a single converter module, and if the phase interleaving technique is not used, the total output current ripple will be doubled. Therefore, numbers of capacitors must be added to the output to suppress excessive current ripple, but this will cause the whole circuit to be too large and increase in cost. Therefore, phase interleaving technique must be used to interleave the output current ripples of each module to reduce the total output current ripple. As shown in FIG. 4, when the first converter module 10 and the second converter module 12 are driven at a staggered angle of 30 degrees, the amount of current ripple is the smallest. Therefore, in the embodiment of the present disclosure, the first converter module 10 and the second converter module 12 are driven at a staggered angle of 30 degrees.

Referring to FIG. 1 again, the third calculation module 165 can calculate a second phase shift angle φ2 according to a difference between half of the output load current Io and the second load current IoB. With further reference to FIG. 2, the third calculation module 165 can include a second subtractor M2 and a second proportional integrator PI2. The second subtractor is configured to subtract half of the output load current Io obtained by the current feedback unit 163 (i.e., Io/2) from the second load current IoB to generate the difference, and the second proportional integrator PI2 calculates the second phase shift angle φ2 based on the difference.

Next, the PWM module 166 generates a second switch signal group S3 and a second rectifier switch signal group S4 for driving the second converter module 12 according to the operating frequency fsw, the second phase shift angle φ2, and an interleaving control phase (the 30-degree phase required by the interleaving operation mechanism described above), as shown in FIG. 3.

In order to reduce the amount of ripple, the first switch signal group S1 and the second switch signal group S3 have a phase difference of 30 degrees, and a phase difference between the second switch signal group S3 and the second rectifier switch signal group S4 is the obtained second phase shift angle φ2.

Similarly, as shown in FIG. 3, the second switch signal group S3 includes a fourth switch sub-signal group S31, a fifth switch sub-signal group S32, and a sixth switch sub-signal group S33, the fourth switch sub-signal group S31 and the fifth switch sub-signal group S32 have a phase difference of 120 degrees, and the fourth switch sub-signal group S31 and the sixth switch sub-signal group S33 have a phase difference of 240 degrees.

In more detail, the 30-degree phase difference of interleaving control essentially refers to a phase difference between a starting point for turning on the switch Sa1 and a starting point for turning on the switch Sb1 in a single cycle. In other words, there is the 30 degree phase difference between the first switching sub-signal group S11 and the fourth switching sub-signal group S31.

On the other hand, the second rectifier switch signal group S4 includes a fourth rectifier switch sub-signal group S41, a fifth rectifier switch sub-signal group S42, and a sixth rectifier switch sub-signal group S43 for controlling the first-phase rectifier circuit (the switches Sba, Sbb), the second-phase rectifier circuit (the switches Sbc, Sbd), and the third-phase rectifier circuit (the switches Sbe, Sbf), respectively.

Similarly, as shown in FIG. 3, the fourth rectifier switch sub-signal group S41 and the fifth rectifier switch sub-signal group S42 have a phase difference of 120 degrees, the fourth rectifier switch sub-signal group S41 and the sixth rectifier switch sub-signal group S43 have a phase difference of 240 degrees, and a phase difference between the fourth switch sub-signal group S31 and the fourth rectifier switch sub-signal group S41 is the second phase shift angle φ2.

It should be noted that both the first converter module 10 and the second converter module 12 operate in a forward operation mode. In addition, an operation interval analysis, soft switching conditions, transmission powers, and a relationship between gain curves are not focused in the present disclosure, and detailed descriptions thereof are thus omitted herein.

In conclusion, the interleaved three-phase Y-delta connected power converter provided by the present disclosure has two three-phase Y-delta connected converters using interleaved control technology, and phases of interleaved switch signals are staggered and have a phase difference of 30 degrees. The interleaved three-phase Y-delta connected power converter is suitable for high-voltage input, low-voltage output, and high-power applications, and modulation phase shift and a frequency current sharing mechanism provided by the present disclosure can reduce output ripples.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An interleaved three-phase Y-delta connected power converter, comprising:
   an input voltage source providing an input voltage;
   an input capacitor connected in parallel with the input voltage source with respect to a first input node and a second input node;
   a first converter module and a second converter module, each including:
      a three-phase full bridge circuit connected to the first input node and the second input node, and including a first phase circuit, a second phase circuit, and a third phase circuit, in which the first phase circuit, the second phase circuit, and the third phase circuit each includes an upper bridge switch and a lower bridge switch connected in series, and have a first center point, a second center point, and a third center point, respectively;
      a first resonance tank having one end connected to the first center point, and having a first resonance capacitor and a first resonance inductance;
      a second resonance tank having one end connected to the second center point, and having a second resonance capacitor and a second resonance inductance;
      a third resonance tank having one end connected to the third center point, and having a third resonance capacitor and a third resonance inductance;
      a three-phase transformer having a primary side connected to the first resonant tank, the second resonant tank, and the third resonant tank in a Y-connection relative to a common node; and
      a three-phase rectifier circuit including a first-phase rectifier circuit, a second-phase rectifier circuit, and a third-phase rectifier circuit connected in parallel with respect to a first output node and a second output node, wherein the first-phase rectifier circuit, the second-phase rectifier circuit, and the third-phase rectifier circuit each includes an upper bridge rectifier switch and a lower bridge rectifier switch connected in series, and respectively has a first rectifier center point, a second rectifier center point, and a third rectifier center point, and the three-phase transformer has a second side connected to the first rectifier center point, the second rectifier center point, and the third rectifier center point in a delta connection;
   an output circuit including an output capacitor and an output load connected in parallel with respect to the first output node and the second output node; and
   a control circuit including:
      a voltage feedback unit configured to detect an output voltage of the output circuit;
      a first calculation module configured to calculate an operating frequency based on a difference between the output voltage and a reference voltage;
      a current feedback unit configured to detect an output load current of the output load and a second load current provided by the second converter module;
      a second calculation module configured to calculate a first phase shift angle according to the output load current and an ideal operating frequency;
      a third calculation module configured to calculate a second phase shift angle according to a difference between a half of the output load current and the second load current; and
      a pulse width modulation (PWM) module configured to generate, according to the operating frequency and the first phase shift angle, a first switch signal group for driving the three-phase full bridge circuit of the first converter module and a first rectifier switch signal group for driving the three-phase rectifier circuit of the first converter module, and generate, according to the operating frequency, the second phase shift angle and an interleaved control phase, a second switch signal group for driving the three-phase full bridge circuit of the second converter module and a second rectifier switch signal group for driving the three-phase rectifier circuit of the second converter module;

wherein a phase difference between the first switch signal group and the second switch signal group is 30 degrees, a phase difference between the first switch signal group and the first rectifier switch signal group is the first phase shift angle, and a phase difference between the second switch signal group and the second rectifier switch signal group is the second phase shift angle.

2. The power converter according to claim 1, wherein the first calculation module includes a first subtractor and a first proportional integrator, the first subtractor is configured to subtract the output voltage from the reference voltage to generate the difference between the output voltage and the reference voltage, and the first proportional integrator is configured to calculate the operating frequency according to the difference between the output voltage and the reference voltage.

3. The power converter according to claim 1, wherein the third calculation module includes a second subtractor and a second proportional integrator, the second subtractor is configured to subtract the half of the output load current from the second load current to generate the difference between the half of the output load current and the second load current, and the second proportional integrator is configured to calculate the second phase shift angle based on the difference between the half of the output load current and the second load current.

4. The power converter according to claim 1, wherein the first switch signal group includes a first switch sub-signal group, a second switch sub-signal group, and a third switch sub-signal group for controlling the first phase circuit, the second phase circuit, and the third phase circuit, respectively, and wherein the first switch sub-signal group and the second switch sub-signal group have a phase difference of 120 degrees, and the first switch sub-signal group and the third switch sub-signal group have a phase difference of 240 degrees.

5. The power converter according to claim 4, wherein the first switch sub-signal group includes a first switch signal and a second switch signal for controlling the upper bridge switch and the lower bridge switch of the first phase circuit, respectively, a duty cycle of each of the first switch signal and the second switch signal is 50%, and the first switch signal and the second switch signal are complementary in a switching cycle.

6. The power converter according to claim 5, wherein the second switch signal group includes a fourth switch sub-signal group, a fifth switch sub-signal group, and a sixth switch sub-signal group for controlling the first phase circuit, the second phase circuit, and the third phase circuit, respectively, and wherein the fourth switch sub-signal group and the fifth switch sub-signal group have a phase difference of 120 degrees, and the fourth switch sub-signal group and the sixth switch sub-signal group have a phase difference of 240 degrees.

7. The power converter according to claim 6, wherein the first switch sub-signal group and the fourth switch sub-signal group have a phase difference of 30 degrees.

8. The power converter according to claim 6, wherein the second rectifier switch signal group includes a fourth rectifier switch sub-signal group, a fifth rectifier switch sub-signal group, and a sixth rectifier switch sub-signal group for controlling the first-phase rectifier circuit, the second-phase rectifier circuit, and the third-phase rectifier circuit, respectively, and wherein the fourth rectifier switch sub-signal group and the fifth rectifier switch sub-signal group have a phase difference of 120 degrees, the fourth rectifier switch sub-signal group and the sixth rectifier switch sub-signal group have a phase difference of 240 degrees, and a phase difference between the fourth switch sub-signal group and the fourth rectifier switch sub-signal group is equal to the second phase shift angle.

9. The power converter according to claim 4, wherein the first rectifier switch signal group includes a first rectifier switch sub-signal group, a second rectifier switch sub-signal group, and a third rectifier switch sub-signal group for controlling the first-phase rectifier circuit, the second-phase rectifier circuit, and the third-phase rectifier circuit, respectively, and wherein the first rectifier switch sub-signal group and the second rectifier switch sub-signal group have a phase difference of 120 degrees, the first rectifier switch sub-signal group and the third rectifier switch sub-signal group have a phase difference of 240 degrees, and a phase difference between the first switch sub-signal group and the first rectifier switch sub-signal group is the first phase shift angle.

10. The power converter according to claim 9, wherein the first rectifier switch sub-signal group includes a first rectifier switch signal and a second rectifier switch signal for controlling the upper bridge rectifier switch and the lower bridge rectifier of the first-phase rectifier circuit, respectively, a duty cycle of each of the first rectifier switch signal and the second rectifier switch signal is 50%, and the first rectifier switch signal and the second rectifier switch signal are complementary in a switching cycle.

* * * * *